United States Patent
Tsuyuki

(10) Patent No.: US 8,572,415 B2
(45) Date of Patent: Oct. 29, 2013

(54) STORAGE SYSTEM

(75) Inventor: Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 13/364,559

(22) Filed: Feb. 2, 2012

(65) Prior Publication Data

US 2012/0137143 A1    May 31, 2012

Related U.S. Application Data

(63) Continuation of application No. 12/310,735, filed as application No. PCT/JP2009/000911 on Feb. 27, 2009, now Pat. No. 8,135,967.

(51) Int. Cl.
| | | |
|---|---|---|
| *G06F 1/00* | (2006.01) | |
| *G06F 11/00* | (2006.01) | |
| *G05F 1/577* | (2006.01) | |
| *G05F 1/573* | (2006.01) | |
| *H02J 1/10* | (2006.01) | |
| *H02M 5/42* | (2006.01) | |

(52) U.S. Cl.
USPC ............. 713/300; 323/267; 323/277; 363/65; 363/84; 714/6.22; 714/14

(58) Field of Classification Search
USPC ............... 713/300; 323/267, 277; 363/65, 84; 714/6.22, 14
See application file for complete search history.

(56) References Cited

U.S. PATENT DOCUMENTS

| | | | |
|---|---|---|---|
| 6,153,946 A * | 11/2000 | Koch et al. ................ | 307/64 |
| 7,051,216 B2 | 5/2006 | Suzuki et al. | |
| 7,151,678 B2 * | 12/2006 | Booth .......................... | 363/15 |
| 7,205,681 B2 | 4/2007 | Nguyen | |
| 7,243,248 B1 | 7/2007 | Roux et al. | |
| 7,360,107 B2 | 4/2008 | Yuasa | |
| 7,612,467 B2 | 11/2009 | Suzuki et al. | |
| 7,667,918 B2 | 2/2010 | Hayashi et al. | |
| 7,698,595 B2 | 4/2010 | Inoue et al. | |

(Continued)

FOREIGN PATENT DOCUMENTS

| | | |
|---|---|---|
| EP | 1 411 523 A2 | 4/2004 |
| EP | 1 411 523 A3 | 4/2004 |

(Continued)

OTHER PUBLICATIONS

International Search Report of PCT/JP2009/000911 mailed Jul. 27, 2009.

(Continued)

*Primary Examiner* — Stefan Stoynov
(74) *Attorney, Agent, or Firm* — Stites & Harbison PLLC; Juan Carlos A. Marquez, Esq.

(57) ABSTRACT

A storage system includes one or more first power supplies which receive power from the first input and supplies power to each of multiple load groups through multiple first paths and multiple second power supplies which receive power from the second input and supplies power to each of the multiple load groups through multiple second paths. Each load group is comprised of at least one load, and each load is a storage device. Power is supplied from different second power supplies respectively to two or more load groups to which power is supplied from the first power supply through two or more first paths.

5 Claims, 19 Drawing Sheets

(56) References Cited

U.S. PATENT DOCUMENTS

| | | | |
|---|---|---|---|
| 7,705,562 | B2 | 4/2010 | Takahashi et al. |
| 2007/0255968 | A1 | 11/2007 | Suzuki et al. |
| 2008/0028238 | A1 | 1/2008 | Lucas et al. |

FOREIGN PATENT DOCUMENTS

| | | | |
|---|---|---|---|
| EP | 1 830 271 | A1 | 9/2007 |
| EP | 1 843 248 | A1 | 10/2007 |
| JP | 2004-126972 | | 10/2002 |
| JP | 2004-126972 | A | 4/2004 |
| JP | 2006-209218 | A | 8/2006 |
| JP | 2006-313487 | A | 11/2006 |
| JP | 2007-68338 | A | 3/2007 |
| JP | 2007-282407 | A | 10/2007 |
| JP | 2008-102804 | | 5/2008 |

OTHER PUBLICATIONS

Office Action issued from the Japanese Patent Office, in the corresponding Japanese Patent Application 2011-514960, dated Jun. 26, 2012, pp. 1-2.

* cited by examiner

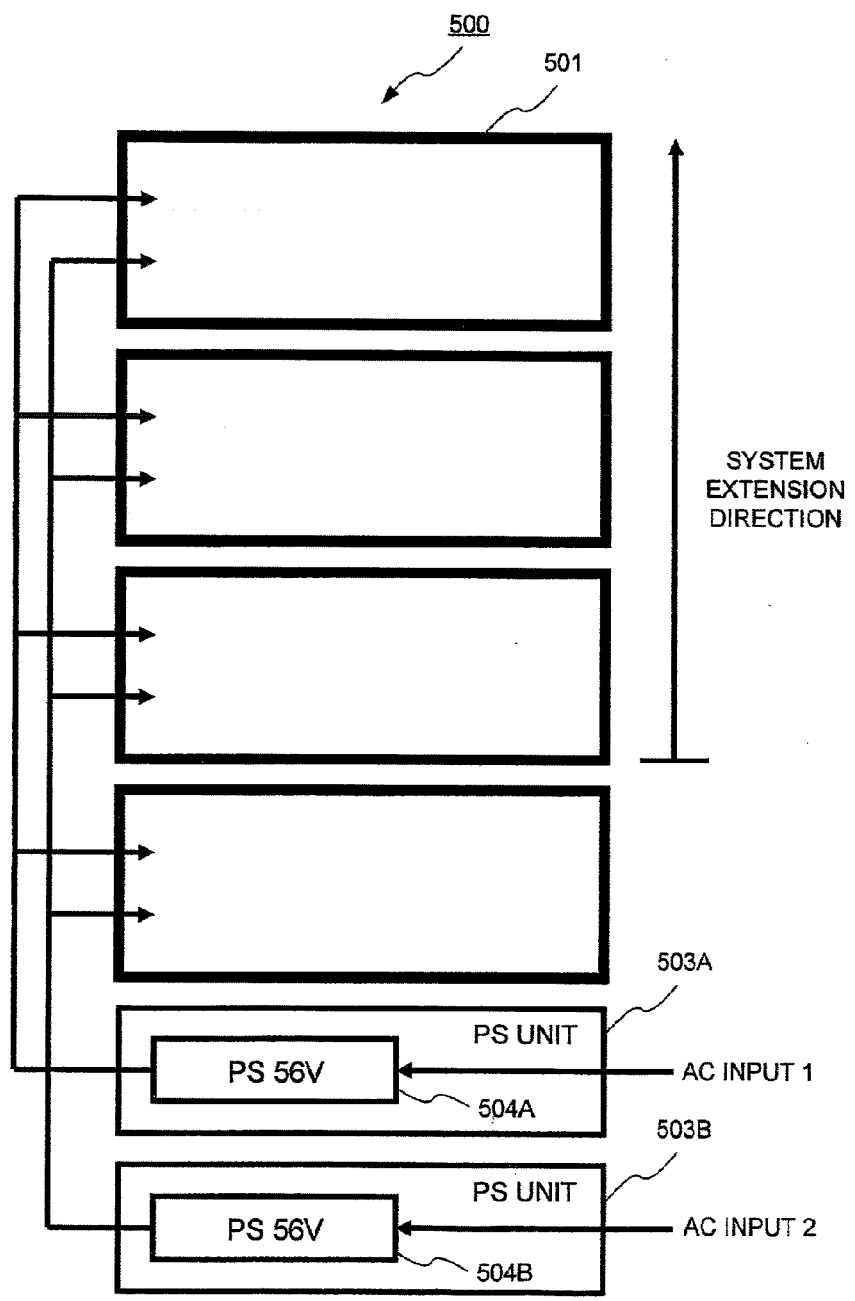

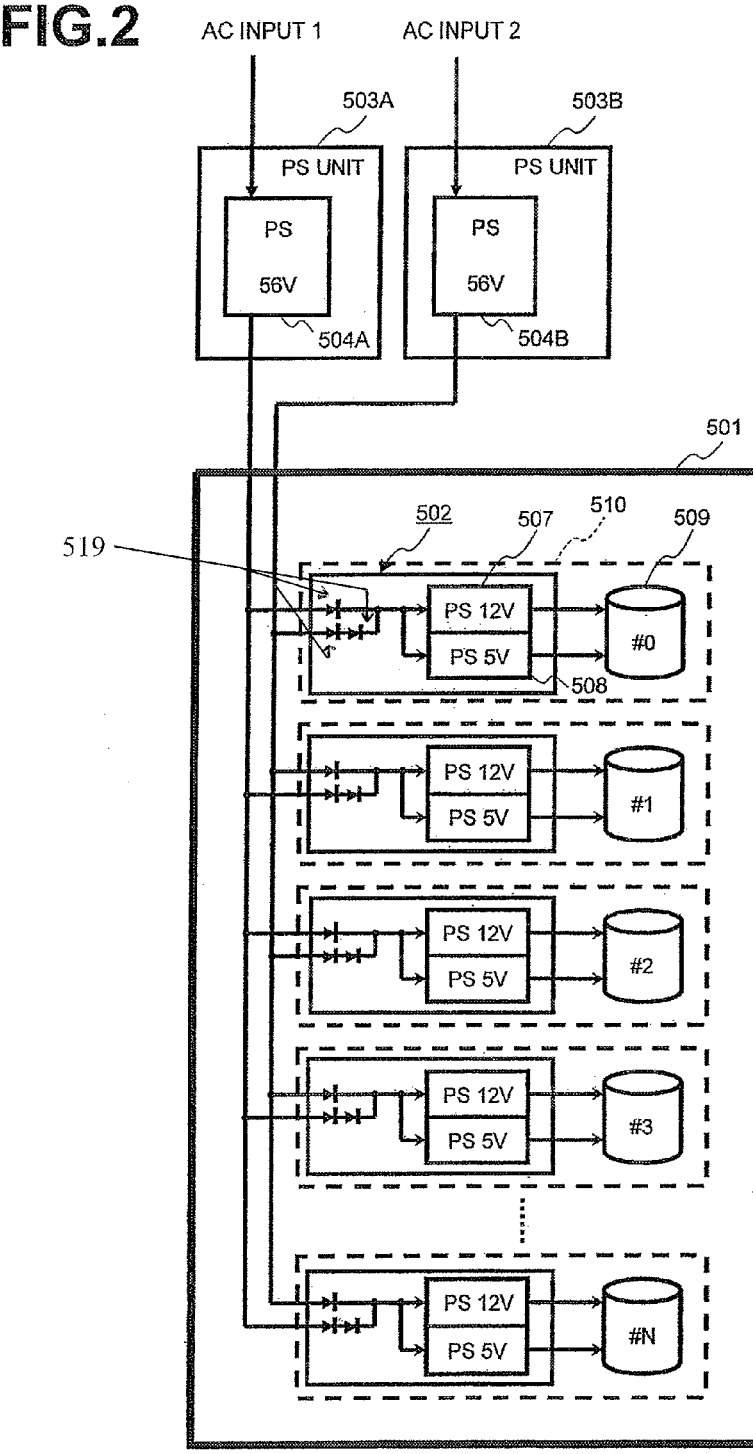

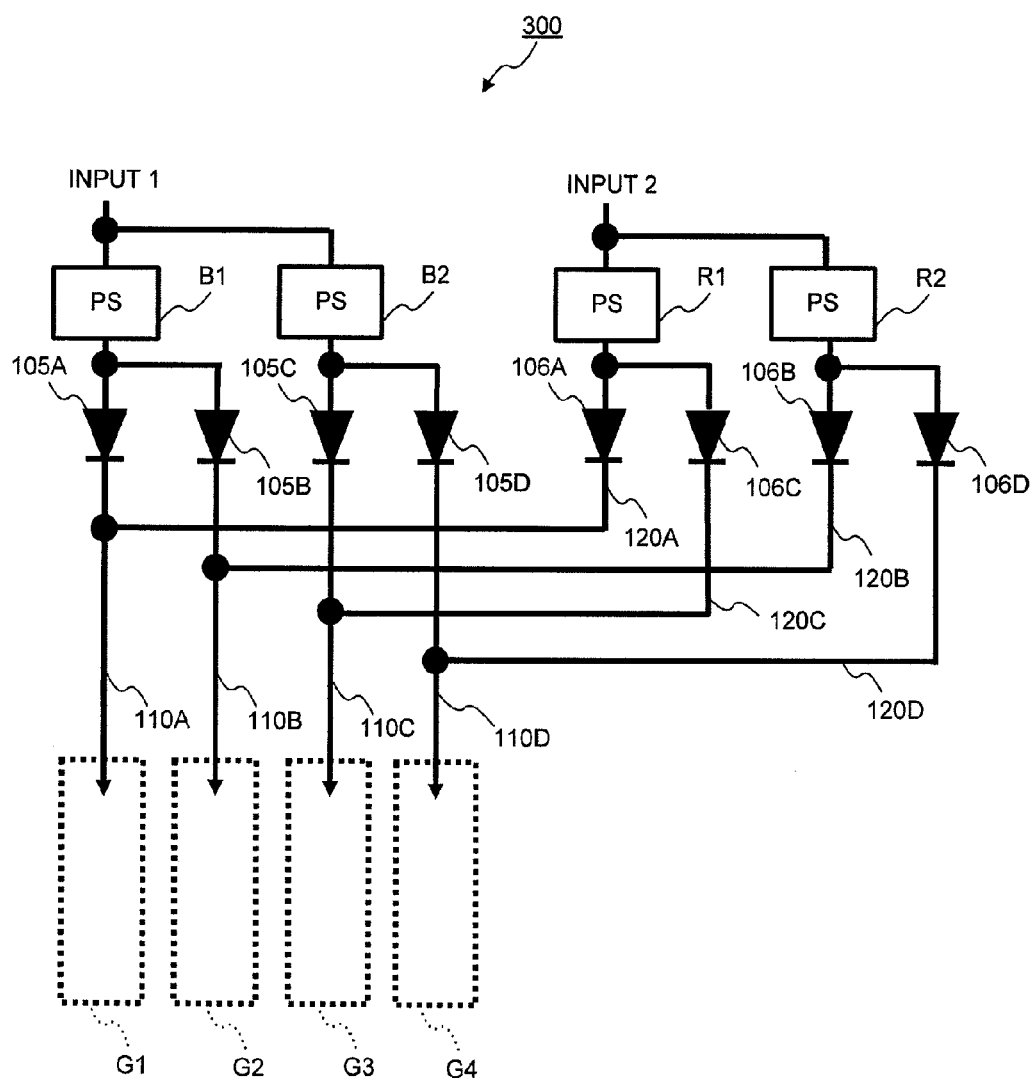

STORAGE SYSTEM

CROSS REFERENCE TO RELATED APPLICATIONS

This application is a Continuation of U.S. application Ser. No. 12/310,735 filed on Mar. 5, 2009. Priority is claimed based on U.S. application Ser. No. 12/310,735 filed on Mar. 5, 2009, which claims priority to PCT Application PCT/JP2009/000911 filed on Feb. 27, 2009, all of which is incorporated by references.

TECHNICAL FIELD

This invention generally relates to a storage system, specifically to the power feeding part of the storage system.

BACKGROUND ART

An example of a technology regarding the power supply of a storage system is the technology disclosed in Patent Citation 1. Patent Citation 1, for example, discloses the following.

As shown in FIG. 1, the storage system 500 has one or more chassis 501 and redundant power supply units 503A and 503B. The power supply unit 503A (503B) includes a 56-volt power supply 504A (504B) (the AC/DC converter which converts AC voltage from the AC power supply into 56-volt DC voltage). The chassis 501, as shown in FIG. 2, includes multiple canisters 502. Each canister 502 includes an HDD (Hard Disk Drive) 509, a 12-volt power supply 507 (DC/DC converter which lowers DC voltage from 56-volt to 12-volt), a 5-volt power supply 508 (DC/DC converter which lowers DC voltage from 56-volt to 5-volt) and a backflow prevention elemental device 519 (for example, a diode).

In the canister 502, one power feeding path (hereinafter referred to as "first path") includes a backflow prevention elemental device 519, and the other power feeding path (hereinafter referred to as "second path") includes two backflow prevention elemental devices 519. Usually, power is supplied from one 56-volt power supply 504A through the first path (main power feeding path) to the power supply 507 and 508 in each canister 502, and in case of failure, power is supplied from the other 56-volt power supply 504B through the second path to the power supply 507 and 508 in each canister 502. That is, a power supply boundary 510 is supposed to be formed in each canister 502. "Power supply boundary" indicates the configuration where, in the system which includes a power feeding system in each load group configured of one or more loads (according to FIG. 2, a load group is an HDD 509), includes boundaries among the power feeding systems so that, even if the power feeding path in one power feeding system shorts out and consequently power is not supplied to the load group corresponding to the power feeding system, power feeding will be continued through the power feeding path of another power feeding system to the other load groups. In other words, each power supply boundary is each of the load groups corresponding to the power feeding systems.

Patent Citation 1

Japanese Patent Application Laid-Open Publication No. 2004-126972

DISCLOSURE OF INVENTION

Technical Problem

According to the storage system described by referring to FIG. 1 and FIG. 2, there is a problem that, if the input part of the power supply 507 and 508 shorts out, the output of both of the 56-volt power supplies 504A and 504B is affected due to the configuration of the wiring. Therefore, in installation, specific measures have to be taken such as the equipment for electrically disconnecting the power feeding path, which might enlarge the scale.

Additionally, according to above mentioned storage system, since each HDD 509 requires the power supply 507 (508), many power supplies 507 (508) are required.

Additionally, according to above mentioned storage system, due to the configuration where a power supply 507 (508) is installed with only one power feeding system for each load group (according to the examples of FIG. 1 and FIG. 2, an HDD 509), the power supply 507 (508) of the load group has no redundancy.

Therefore, the objective of this invention is to allow a system which is a feeding part of a storage system and includes a power supply boundary and redundant power supplies in each load group to be a small scale.

Technical Solution

A storage system includes one or more first power supplies and multiple second power supplies. The one or more first power supplies receive power from the first input and supply power through multiple first paths to multiple load groups. The multiple second power supplies receive power from the second input and supply power through multiple second paths to those multiple load groups. Each load group is comprised of at least one load, and each load is a storage device. Power is supplied from different second power supplies respectively to each of two or more load groups to which power is supplied from one first power supply through two or more first paths. A storage device can be, for example, an HDD, an optical disk, non-volatile memory (e.g. flash memory, FeRAM (Ferro Electric Random Access Memory) and ReRAM (Resistive Random Access Memory), etc.). In a storage system, multiple types of storage devices can exist together.

BRIEF DESCRIPTION OF DRAWINGS

FIG. 1 shows the outline of a conventional storage system.

FIG. 2 shows the configuration of the power feeding system in a conventional storage system.

FIG. 3 shows the outline of the first embodiment of this invention.

EXPLANATION OF REFERENCE

Figure 4A:
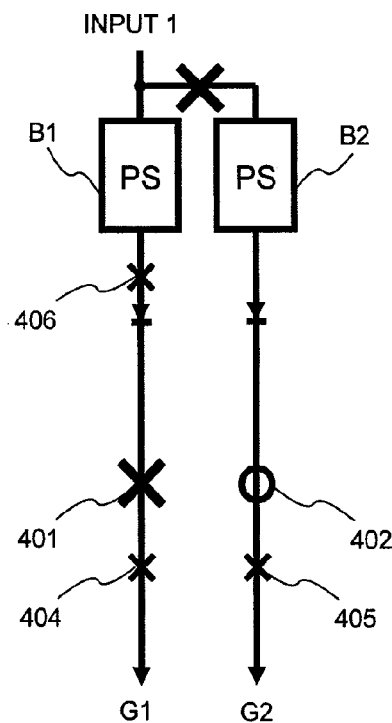
FIG. 4A shows a configuration example of the power feeding part where each power feeding system of two load groups is not made redundant.

300: indicates a storage system.

BEST MODE FOR CARRYING OUT THE INVENTION

Some embodiments of this invention are described below, referring to the attached figures. Note that, since a load group is considered a power supply boundary in those embodiments, a load group might be referred to as a "power supply boundary." Furthermore, the following description assumes each of the multiple storage devices installed in the storage system to be HDD.

[Mode for the Invention 1]

FIG. 3 shows the outline of the first embodiment of this invention.

According to FIG. 3, as an example of multiple power supply boundaries which the storage system 300 (load group) has, four power supply boundaries G1 to G4 are shown. If the number of power supply boundaries is four, two first power supplies B1 and B2, and two second power supplies R1 and R2 are installed in the storage system.

The first power supply B1 is connected to the power supply boundary G1 (and G2) through the first path 110A (and 110B), and supplies the power based on the power from the input 1 to power supply boundaries G1 and G2. The first power supply B2 is connected to the power supply boundary G3 (and G4) through the first path 110C (and 110D), and supplies the power based on the power from the input 1 to power supply boundaries G3 and G4. Note that, in the first paths 110A, 110B, 110C and 110D, backflow prevention elemental devices (for example, diodes), which are 105A, 105B, 105C and 105D respectively, are installed. In addition, the input 1 and the input 2 are the upper power supplies (for example, commercial power or AC/DC converters).

The second power supply R1 is connected to the first path 110A (and 110C) through the second path 120A (and 120C), and is supposed to execute power feeding for the power supply boundary G1 and/or G3 in case of failure in the first power supply B1 and/or B2. The second power supply R2 is connected to the first path 110B (and 110D) through the second path 120B (and 120D), and is supposed to execute power feeding for the power supply boundary G2 and/or G4 in case of failure in the first power supply B1 and/or B2. As mentioned above, by the second power supplies R1 and R2 and the first power supplies B1 and B2, the power supply redundancy for the power supply boundaries G1 to G4 has been realized (i.e. the power feeding system has been made redundant in each power supply boundary G1 to G4). Note that, in the second paths 120A, 120B, 120C and 120D, backflow prevention elemental devices 106A, 106B, 106C and 106D respectively, are installed. In addition, instead of the configuration where each of the second paths is connected to some point in the first path, the configuration where the first path and the second path are connected to separate power supply boundaries can be adopted.

One of the characteristics of the power feeding part of the storage system shown in FIG. 3 is as follows. That is, to the power supply boundaries G1 and G3, which are the power feeding targets from a certain first power supply B1, power feeding is supposed to be executed not by the same second power supply R1 (or R2) but by the different second power supplies R1 and R2 respectively. Similarly, to the power supply boundaries G2 and G4, which are the power feeding targets from another first power supply B2, power feeding is supposed to be executed by the different second supplies R1 and R2 respectively.

Furthermore, since power is supposed to be supplied from any of the power supplies B1, B2, R1 and R2 to two of the four power supply boundaries G1 to G4, supposing the power required for each of the power supply boundaries G1 to G4 is "1," the power supply capacity required for each of the power supplies B1, B2, R1 and R2 becomes "2," which is the total sum of the power required for two power supply boundaries that are the power feeding targets. That is, in this embodiment, the power supply capacity is equal in the power supplies B1, B2, R1 and R2.

By the configuration above, it is possible to realize the redundant power feeding system in each load group and make each load group into a power supply boundary, with the minimum number of power supplies.

The process of making the power feeding system of a load group redundant and making a load group a power supply boundary is described as follows.

For example, as shown in FIG. 4A, if the number of power supply boundaries is two and the power feeding system of each of the load groups G1 and G2 is not made redundant, and if a ground short (GND short) occurs in the power feeding path that connects the power supply B1 and the load group G1 (refer to 401), the power feeding from the power supply B1 is stopped (refer to 406), but the power feeding from another power supply B2 to the load group G2 is continued (refer to 402). That is, the load groups G1 and G2 are considered to be power supply boundaries.

However, if the power feeding from the input 1 to the power supplies B1 and B2 is stopped (refer to 403), the power feeding from the power supply B1 to the load group G1 and the power feeding from the power supply B2 to the load group G2 are also stopped (refer to 404 and 405). In addition, if the power feeding from the power supply B1 and B2 is stopped (for example, if the power feeding from the power supply B1 is stopped as shown by 406), the power feeding to the target load group (load group G1 according to the example of FIG. 4A) is also stopped.

Figure 4B:
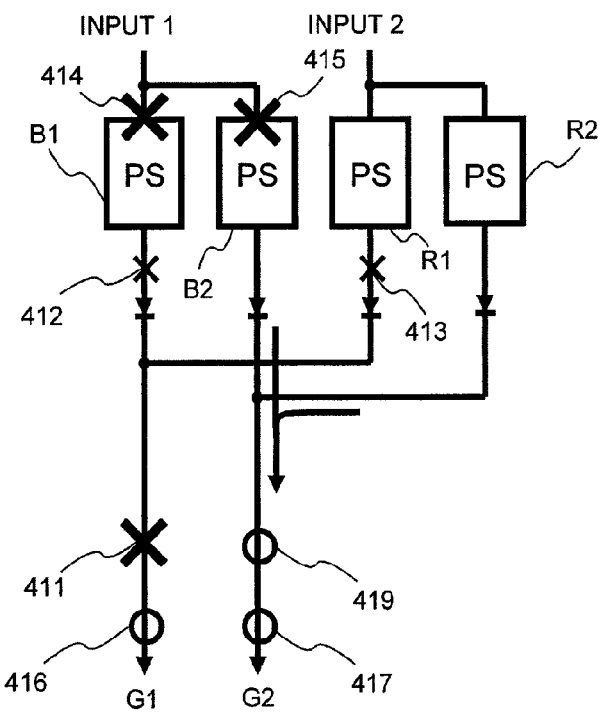
FIG. 4B shows a configuration example of the power feeding part where each power feeding system of two load groups is redundant.

Therefore, in order to make the power feeding system of each of the load groups G1 and G2 redundant, the configuration shown in FIG. 4B can be given as an example. That is, regarding the load group G1 (and G2), the power supply R1 (R2) is provided besides the power supply B1 (B2). Thus, even if the power feeding from both of the power supplies B1 and B2 is stopped due to such causes as failure in the input 1 or failure in the power supplies B1 and B2 (refer to 414 and 415), power is supplied from the power supply R1 (and R2) to the load group G1 (and G2) (refer to 416 and 417). Note that, if a GND short happens in the power feeding path that connects the power supply B1 and the load group G1 (refer to 411), not only the power feeding from the power supply B1 but the power feeding from the power supply R1 is also stopped (refer to 412 and 413), but the power feeding from the power supply B2 (or R2) to the load group G2 is maintained (refer to 419). That is, the load groups G1 and G2 are power supply boundaries, as the configuration shown in FIG. 4A.

According to the configuration of a power feeding part shown in FIG. 4B, it can be realized to both install redundant power feeding systems in the load groups G1 and G2 and make load groups G1 and G2 power supply boundaries. In addition, since B1, B2, R1 and R1 all require the same power supply capacity, one type of power supply is enough. However, the number of power supplies becomes more than the number of power supplies in the configuration shown in FIG. 4A.

Figure 5A:
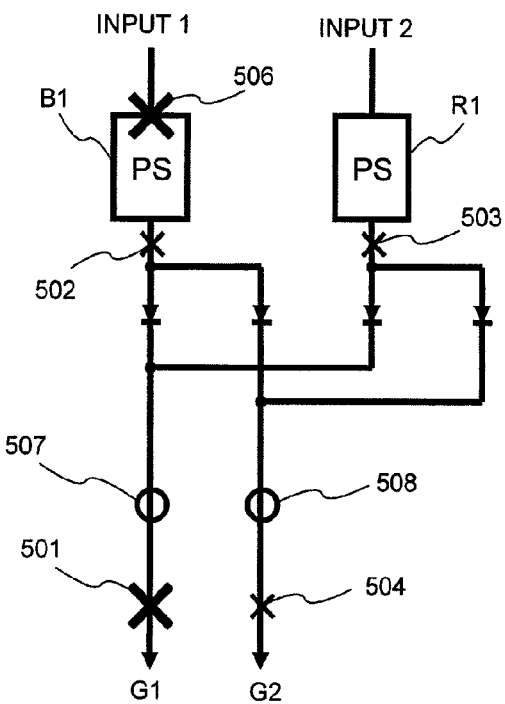
FIG. 5A shows a configuration example of the power feeding part where each of the two load groups is not made a power supply boundary.

On the other hand, for example, as shown in FIG. 5A, if the number of power supplies is two and the redundant power supplies B1 and R1 are installed for load groups G1 and G2 respectively, even if the power feeding from the power supply B1 is stopped (refer to 506), power is supplied from the power supply R1 to the load groups G1 and G2 (refer to 507 and 508). However, if a GND short occurs in the power feeding path that connects the power supply B1 and the load group G1 (refer to 501), not only the power feeding from the power supply B1 but the power feeding from the power supply R1 is also stopped (refer to 502 and 503). Therefore, the power feeding to the load group 2 is stopped (refer to 504). That means that the load groups G1 and G2 are not made power supply boundaries.

Figure 5B:
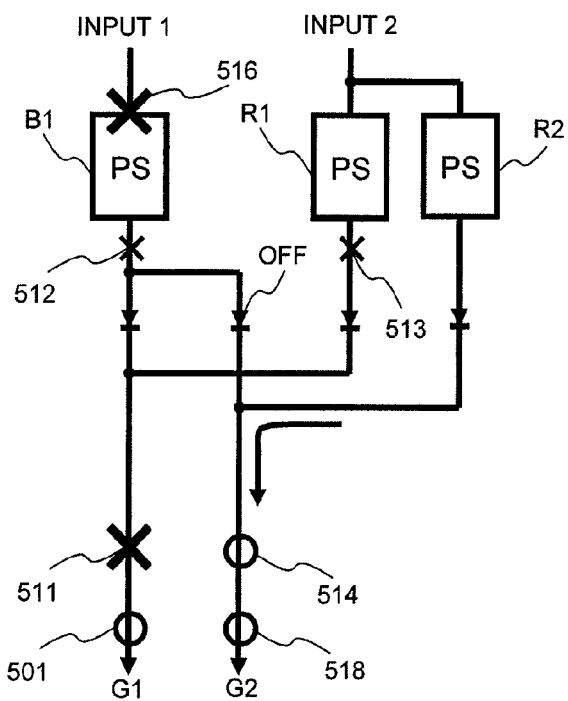
FIG. 5B shows a configuration example of the power feeding part where each of the two load groups is a power supply boundary.

Therefore, in order to make the load groups G1 and G2 power supply boundaries, for example, the configuration shown in FIG. 5B can be given as an example. That is, instead of the common power supply R1 for the load groups G1 and G2, separate power supplies R1 and R2 are adopted. Thus, even if a GND short happen in the power feeding path that connects the power supply B1 and the load group G1 (refer to 511) and not only the power feeding from the power supply B1 but the power feeding from the power supply R1 is also stopped (refer to 512 and 513), power is supplied from the power supply R2 to the load group G2 (refer to 514). Note that, if the power feeding from the power supply B1 is stopped (refer to 516), power is supplied from the power supply R1 (and R2) to the load group G1 (and G2) (refer to 517 (and 518)). That is, the power feeding system of the load groups G1 and G2 have been made redundant, as the configuration shown in FIG. 5A.

According to the configuration of a power feeding part shown in FIG. 5B, it can be realized to both install redundant power feeding systems in the load groups G1 and G2 and make load groups G1 and G2 power supply boundaries. Furthermore, the number of power supplies is smaller than the number of power supplies in the configuration shown in FIG. 4B. However, as the power supply capacity required by the power supply B1 and the power supply capacity required by the power supplies R1 and R2 respectively are different, multiple types of power supplies are required.

In this embodiment, in order to realize both "redundancy of the power feeding system" and "power supply boundary," according to the characteristic described by referring to FIG. 3 (the configuration where, to two or more load groups that receive power feeding from a certain first power supply, power feeding is executed from separate second power supplies), the minimum number of power supplies can be expressed in the following formula:

Number of power supplies=2 times(square root of $q$)     (1)

In this case, q indicates an integer larger than one and it is the number of power supply boundaries. The "square root of q" indicates the square root of q. The part after the decimal point in {2 times (square root of q)} is rounded up. In addition, in this embodiment, as the power feeding system of each power supply boundary is duplicated, the coefficient of square root of q is "2," but the coefficient of square root of q is n if the power feeding system of each power supply boundary is replicated n times (n is an integer larger than two).

By referring to FIGS. 6A to 9B, the relation between the number of load groups and the number of power supplies where the characteristic described by referring to FIG. 3 is adopted. Note that, in FIGS. 6A to 9B, the x mark on a certain power feeding path (x mark beside the power supply boundary (load group)) indicates that a GND short has occurred there, and the O mark on the remaining power feeding paths indicate that, in spite of the GND short in one path, the power feeding continues there.

Considering the following description, if the above-mentioned characteristic is adopted, the minimum number of power supplies results in the value of the above-mentioned formula (1).

Figure 6A:
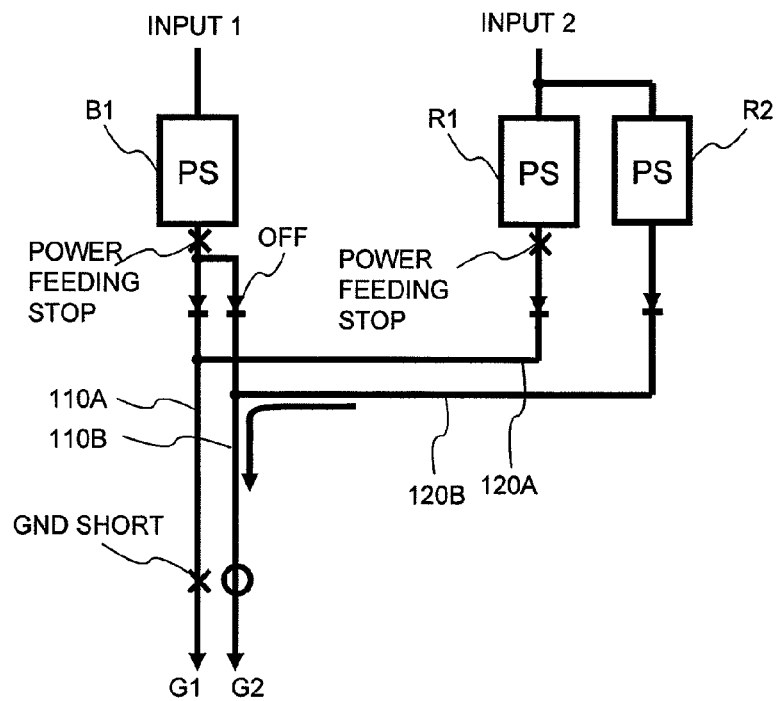
FIG. 6A shows a configuration comprised of the minimum number of power supplies when the number of power supply boundaries is two.

For example, if the number of power supply boundaries is two, the configuration shown in FIG. 6A (the same configuration as the one shown in FIG. 5B) is adopted. That is, power is supplied from the first power supply B1 through the first paths 110A and 110B to two power supply boundaries G1 and G2. To those two power supply boundaries G1 and G2, power is supposed to be supplied from the different second power supplies R1 and R2 through the second paths 120A and 120B respectively. Considering the above-mentioned configuration, if the number of power supply boundaries is two, the minimum number of power supplies is three. According to the formula (1) above:

2 times (square root of (number of power supply boundaries)) =

2 times (square root of 2) = *Approx.* 2.82.

By rounding up the part after the decimal point of the value above, the number of power supplies is three, as mentioned above.

Figure 6B:
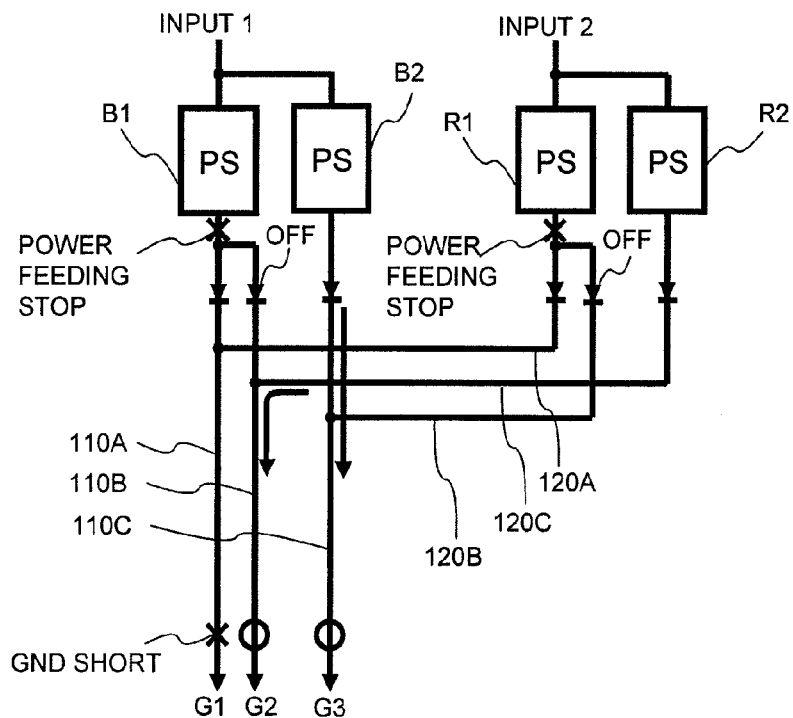
FIG. 6B shows a configuration comprised of the minimum number of power supplies when the number of power supply boundaries is three.

If the number of power supply boundaries is three, the configuration shown in FIG. 6B is adopted. That is, power is supplied to the two power supply boundaries G1 and G2 from the first power supply B1 through the first paths 120A and 120B respectively. To those two power supply boundaries G1 and G2, power is supposed to be supplied from the different second power supplies R1 and R2 through the second paths 120A and 120B respectively. As the power feeding target of the first power supply B2 is a single power supply boundary G2 only, power feeding is executed from a single second power supply R1 (or R2) through the second path 120C to the power supply boundary G2. Considering the above-mentioned configuration, if the number of power supply boundaries is three, the minimum number of power supplies is four. According to the formula (1) above:

2 times (square root of (number of power supply boundaries)) =

2 times (square root of 3) = *Approx.* 3.46.

By rounding up the part after the decimal point of the value above, the minimum number of power supplies is four, as mentioned above.

According to the characteristics by referring to FIG. 3 (i.e. according to the formula (1) above), if the number of power supply boundaries is four or more, the minimum number of power supplies is less than or equal to the number of power supply boundaries.

Figure 7A:
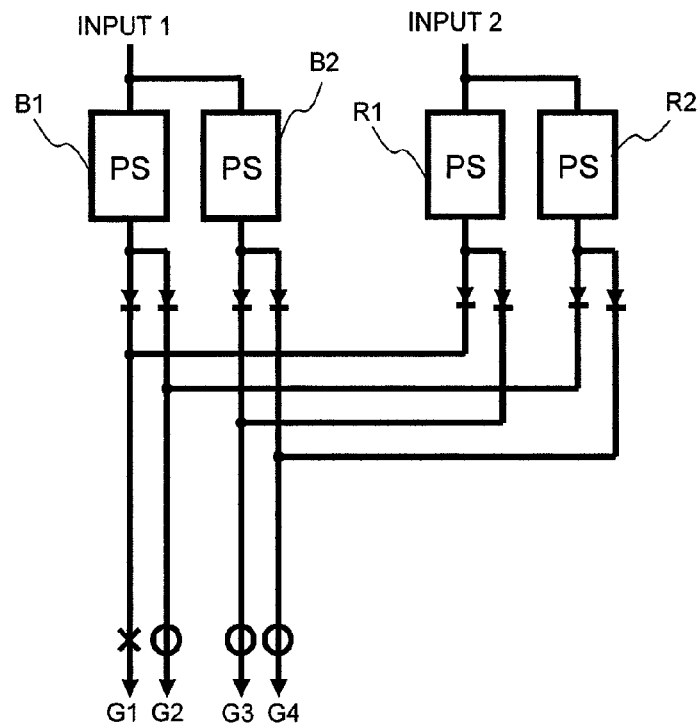
FIG. 7A shows a configuration comprised of the minimum number of power supplies when the number of power supply boundaries is four.

For example, if the number of power supply boundaries is four, the configuration shown in FIG. 7A is adopted. To this configuration, the description by referring to FIG. 3 applies. According to the formula (1) above:

2 times (square root of (number of power supply boundaries)) =

2 times (square root of 4) = 4.

Figure 7B:
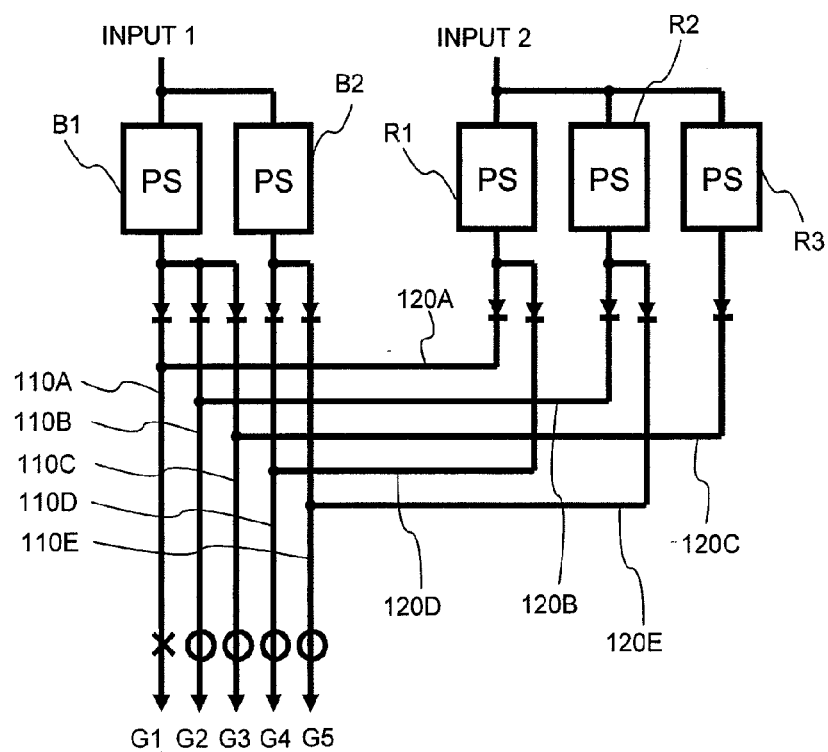
FIG. 7B shows a configuration comprised of the minimum number of power supplies when the number of power supply boundaries is five.

If the number of power supply boundaries is five, the configuration shown in FIG. 7B is adopted. That is, power is supplied from the first power supply B1 through the first paths 110A, 110B and 110C to three power supply boundaries G1, G2 and G3 respectively. To those three power supply boundaries G1, G2 and G3, power is supposed to be supplied from the different second power supplies R1, R2, and R3 through the second paths 120A, 120B and 120C respectively. To the two power supply boundaries G4 and G5 to which power feeding is executed from the second power supply B2 through the first paths 110D and 110E respectively, power feeding is executed from the different second power supplies R1 and R2 through the second paths 120D and 120E. Considering the above-mentioned configuration, if the number of power supply boundaries is five, the minimum number of power supplies is five. According to the formula (1) above:

2 times (square root of (number of power supply boundaries)) =

2 times (square root of 5) = *Approx.* 4.47.

By rounding up the part after the decimal point of the value above, the number of power supplies is five, as mentioned above.

Figure 8A:
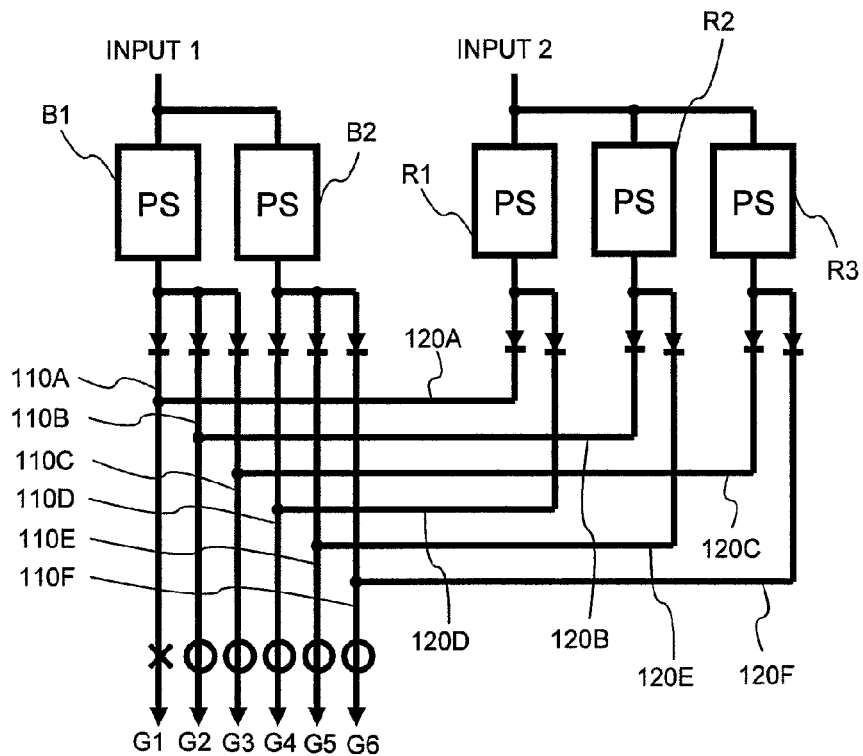
FIG. 8A shows a configuration comprised of the minimum number of power supplies when the number of power supply boundaries is six.

If the number of power supply boundaries is six, the configuration shown in FIG. 8A is adopted. That is, power is supplied from the first power supply B1 through the first paths 110A, 110B and 110C to three power supply boundaries G1, G2 and G3 respectively. To those three power supply boundaries G1, G2 and G3, power is supposed to be supplied from the different second power supplies R1, R2, and R3 through the second paths 120A, 120B and 120C respectively. To the three power supply boundaries G4, G5 and G6 to which power feeding is executed from the second power supply B2 through the first paths 110D, 110E and 110F respectively, power feeding is executed from the different second power supplies R1, R2, and R3 through the second paths 120D, 120E and 120F. Considering the above-mentioned configuration, if the number of power supply boundaries is six, the minimum number of power supplies is five. According to the formula (1) above:

2 times (square root of (number of power supply boundaries)) =

2 times (square root of 6) = *Approx.* 4.89.

By rounding up the part after the decimal point of the value above, the number of power supplies is five, as mentioned above.

Figure 8B:
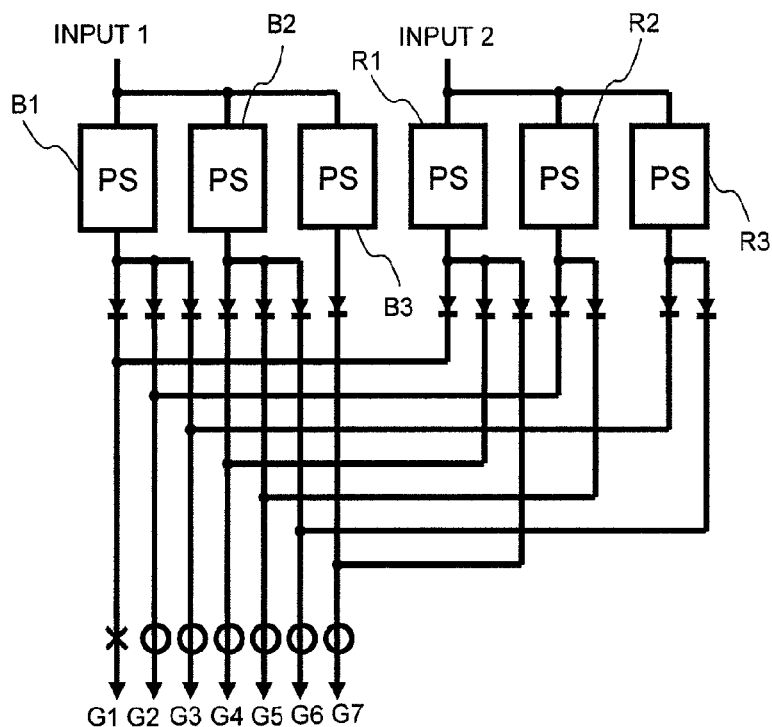
FIG. 8B shows a configuration comprised of the minimum number of power supplies when the number of power supply boundaries is seven.

If the number of power supply boundaries is seven, the configuration shown in FIG. 8B is adopted. That is, if the number of power supply boundaries is six, the minimum number of power supplies is five. According to the formula (1) above:

2 times (square root of (number of power supply boundaries)) =

2 times (square root of 6) = *Approx.* 4.89.

By rounding up the part after the decimal point of the value above, the minimum number of power supplies is five, as mentioned above.

Figure 9A:
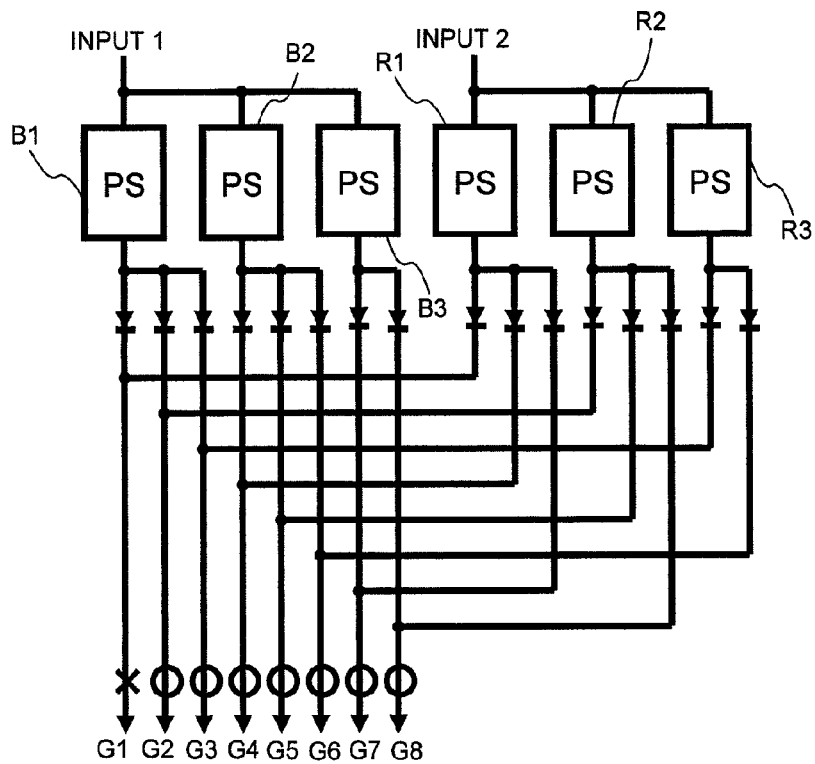
FIG. 9A shows a configuration comprised of the minimum number of power supplies when the number of power supply boundaries is eight.

If the number of power supply boundaries is eight, the configuration shown in FIG. 9A is adopted. That is, if the number of power supply boundaries is eight, the minimum number of power supplies is six. According to the formula (1) above:

2 times (square root of (number of power supply boundaries)) =

2 times (square root of 8) = *Approx.* 5.66.

By rounding up the part after the decimal point of the value above, the minimum number of power supplies is six, as mentioned above.

Figure 9B:
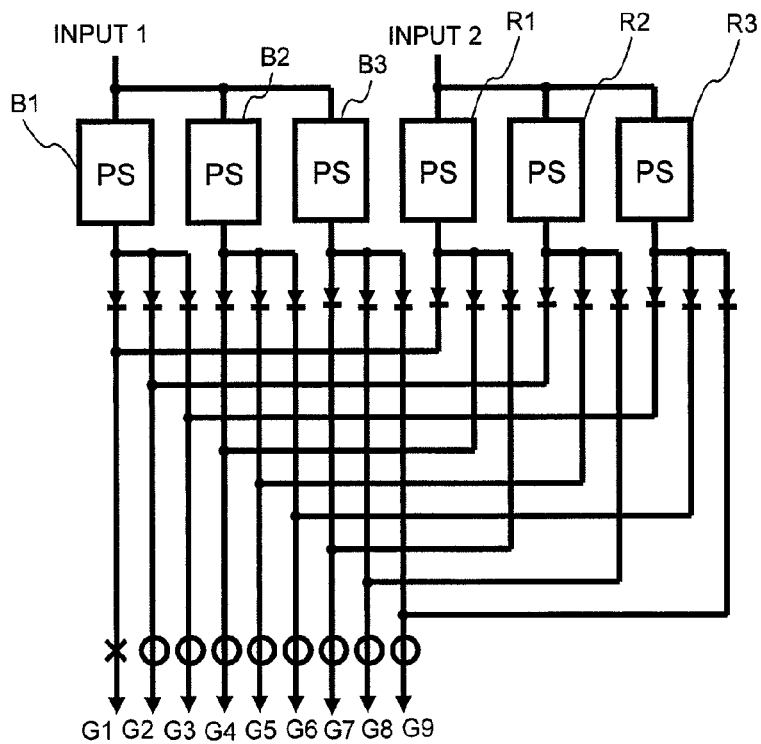
FIG. 9B shows a configuration comprised of the minimum number of power supplies when the number of power supply boundaries is nine.

If the number of power supply boundaries is nine, the configuration shown in FIG. 9B is adopted. That is, if the number of power supply boundaries is nine, the minimum number of power supplies is six. According to the formula (1) above:

2 times (square root of (number of power supply boundaries)) =

2 times (square root of 9) = 6.

As above, the configuration of the power feeding part has been shown in FIGS. 6A to 9B by giving the examples where the number of power supply boundaries is two to nine respectively.

The reason why the above-mentioned configuration is adopted according to the number of power supply boundaries is described by referring to FIGS. 10A to 14B. Note that, in FIGS. 10A to 14B, the figures in bold italic stated beside the power supplies indicate the power supply capacity (amount of stored power) where "1" is specified as the amount of power required for a power supply boundary.

The easiest way of making each load group a power supply boundary and at the same time making the power supply of each load group redundant is adding two power supplies each time the number of power supply boundaries is increased by one.

Figure 10A:
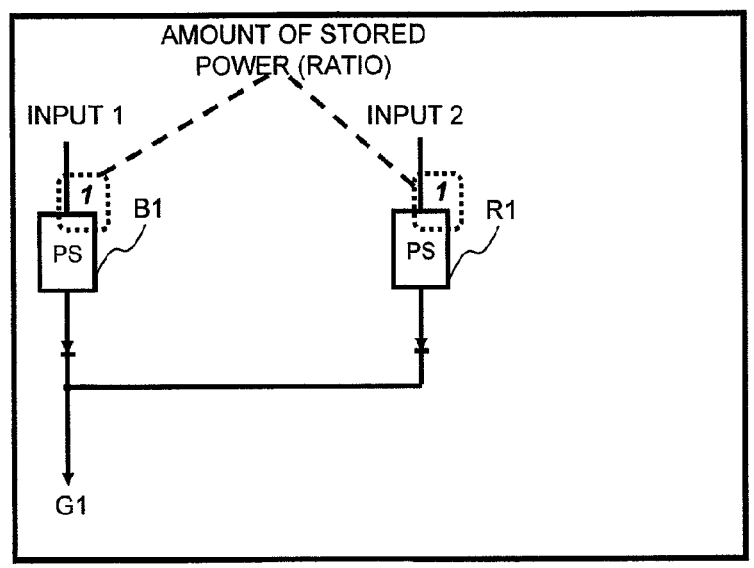
FIG. 10A shows a configuration of a power feeding part where a redundant power supply is installed in each load group, and the number of power supply boundaries is one.
Figure 10B:
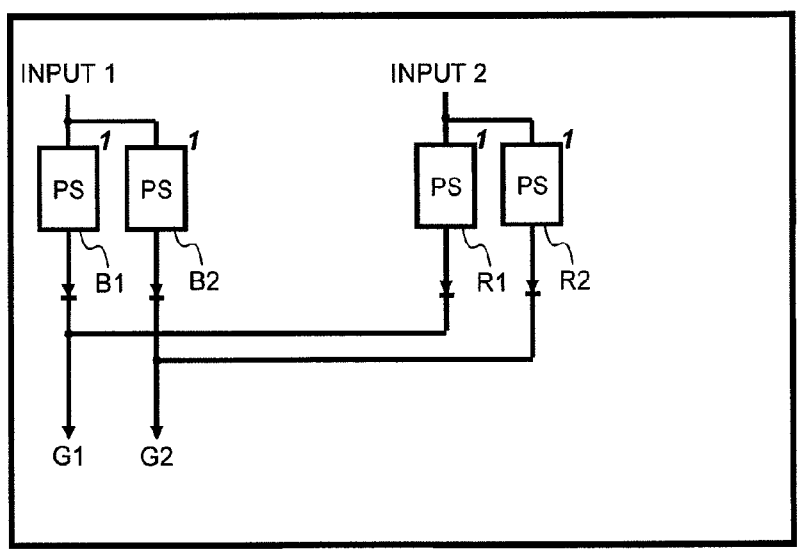
FIG. 10B shows a configuration of a power feeding part where a redundant power supply is installed in each load group, and the number of power supply boundaries is two.
Figure 11A:
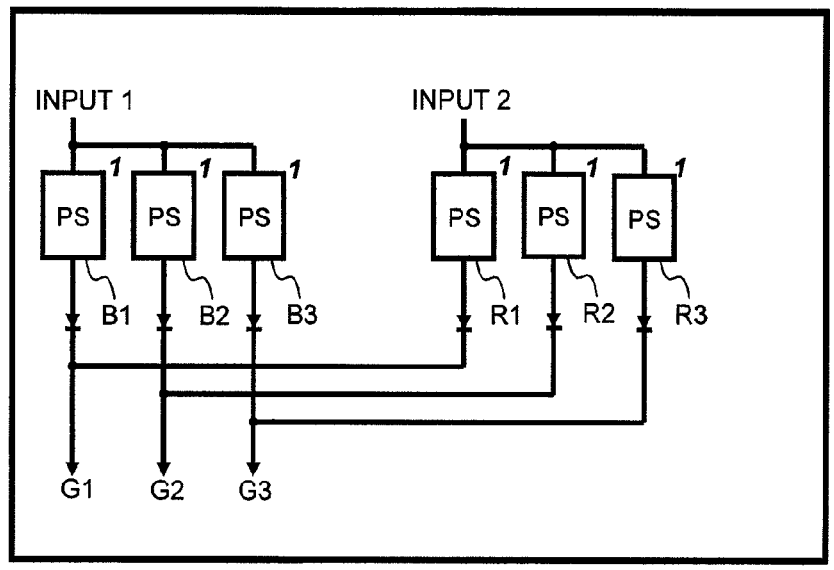
FIG. 11A shows a configuration of a power feeding part where a redundant power supply is installed in each load group, and the number of power supply boundaries is three.
Figure 11B:
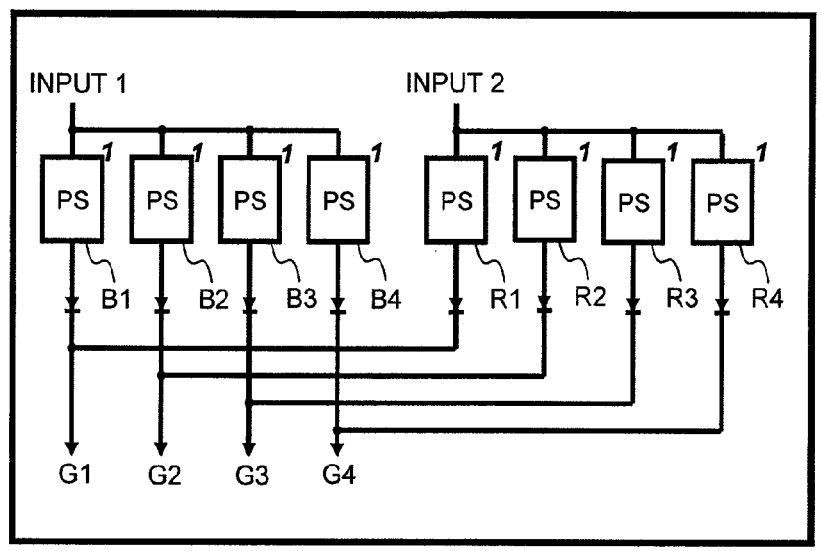
FIG. 11B shows a configuration of a power feeding part where a redundant power supply is installed in each load group, and the number of power supply boundaries is four.

Concretely, for example, as shown in FIG. 10A, if the number of power supply boundaries is one, for that one power supply boundary G1, redundant power supplies B1 and R1 are installed. As shown in FIG. 10B, the number of power supply boundaries increases to two, for the added power supply boundary G2, the redundant power supplies B2 and R2 are installed. As shown in FIG. 10C, the number of power supply boundaries increases to three, for the added power supply boundary G3, the redundant power supplies B3 and R3 are installed. As shown in FIG. 10D, if the number of power supply boundaries increases to four, for the added power supply boundary G4, the redundant power supplies B4 and R4 are installed.

According to one of the above-mentioned characteristics of this embodiment, power is supplied from the first power supply through N first paths to N power supply boundaries, and to those N power supply boundaries, power is configured to be supplied from different N second power supplies through N second paths (N is an integer larger than one). Additionally, the inputs of the first power supply and the second power supply are configured in separate series.

Figure 12A:
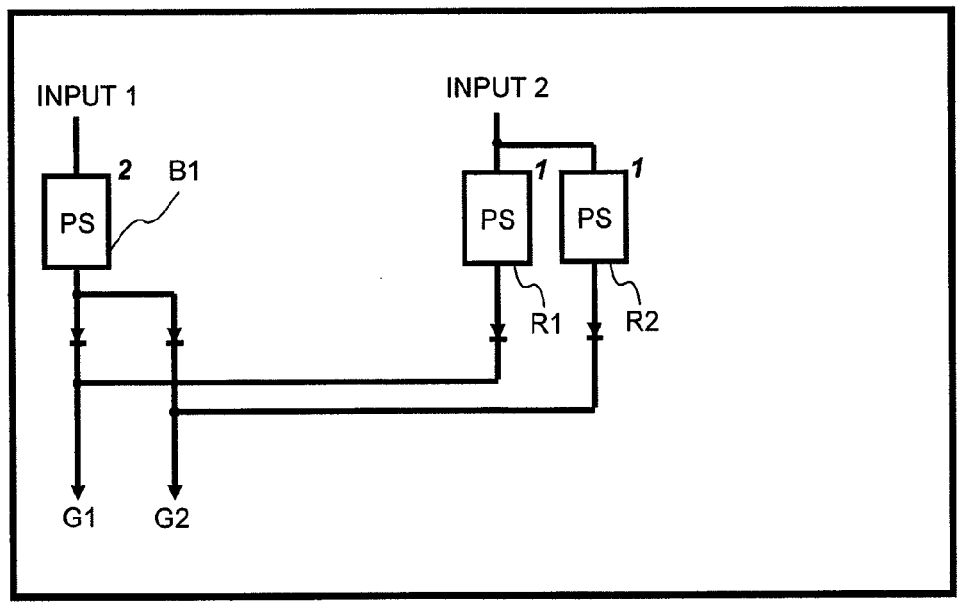
FIG. 12A shows a configuration of a power feeding part where the power supplies B1 and B2 in FIG. 10B are compiled into one power supply B1.
Figure 12B:
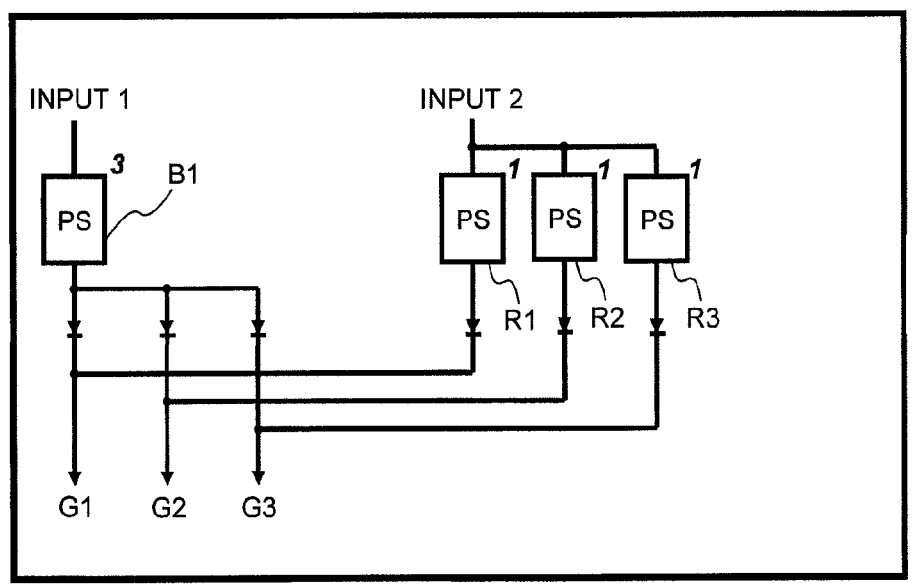
FIG. 12B shows a configuration of a power feeding part where the power supplies B1 to B3 in FIG. 11A are compiled into one power supply B1.
Figure 13A:
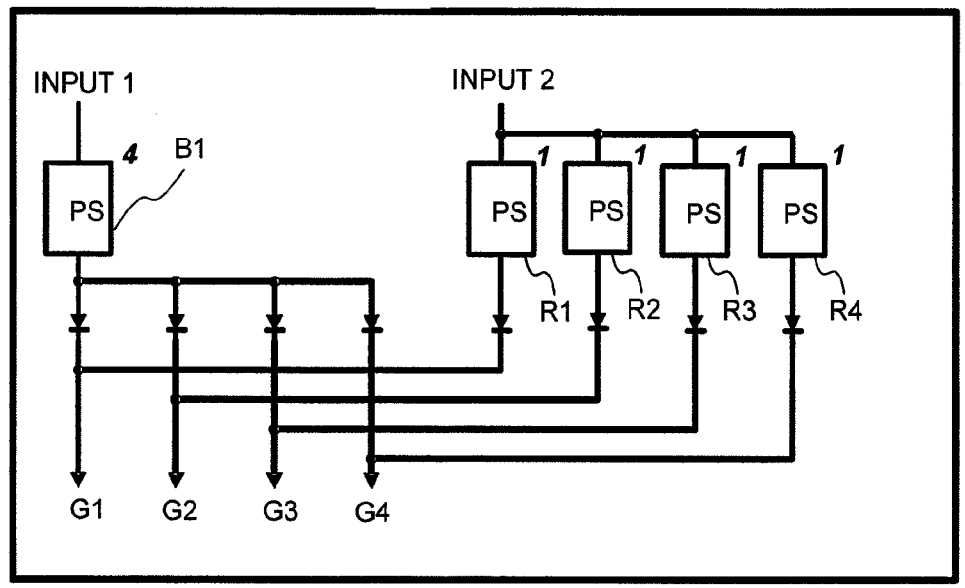
FIG. 13A shows a configuration of a power feeding part where the power supplies B1 to B4 in FIG. 11B are compiled into one power supply B1.

Therefore, if the number of power supply boundaries is two to four and the first power supplies are compiled into one so power will be supplied from that one compiled first power supply to all the power supply boundaries, the configuration of the power feeding part is as shown in FIGS. 12A to 13A. That is, if the number of power supply boundaries is two, power is supplied as shown in FIG. 12A from one first power supply B1 to two power supply boundaries G1 and G2, and to those two power supply boundaries G1 and G2, power is supplied from two different second power supplies R1 and R2 respectively. If the number of power supply boundaries is three, power is supplied as shown in FIG. 12B from one first power supply B1 to three power supply boundaries G1 to G3, and to those three power supply boundaries G1 to G3, power is supplied from three different second power supplies R1 to R3 respectively. If the number of power supply boundaries is four, power is supplied as shown in FIG. 13A from one first power supply B1 to four power supply boundaries G1 to G4, and to those four power supply boundaries G1 to G4, power is supplied from four different second power supplies R1 to R4 respectively. According to the configuration shown in FIGS. 12A to 13A, in the cases where the number of power supply boundaries is two to four, the number of power supplies can be reduced from the number of power supplies shown in FIGS. 10B to 11B respectively.

According to FIGS. 12A to 13A, the required number of second power supplies is the maximum number of first paths that the power supplied by one first power supply passes (i.e. first paths corresponding to one first power supply). Therefore, if it is possible to reduce the maximum number of first paths corresponding to one first power supply, the number of second power supplies can be reduced.

Based on the above-mentioned perspective, as for the cases where the number of power supply boundaries is three to four, the power supplies can be compiled as follows.

Figure 13B:
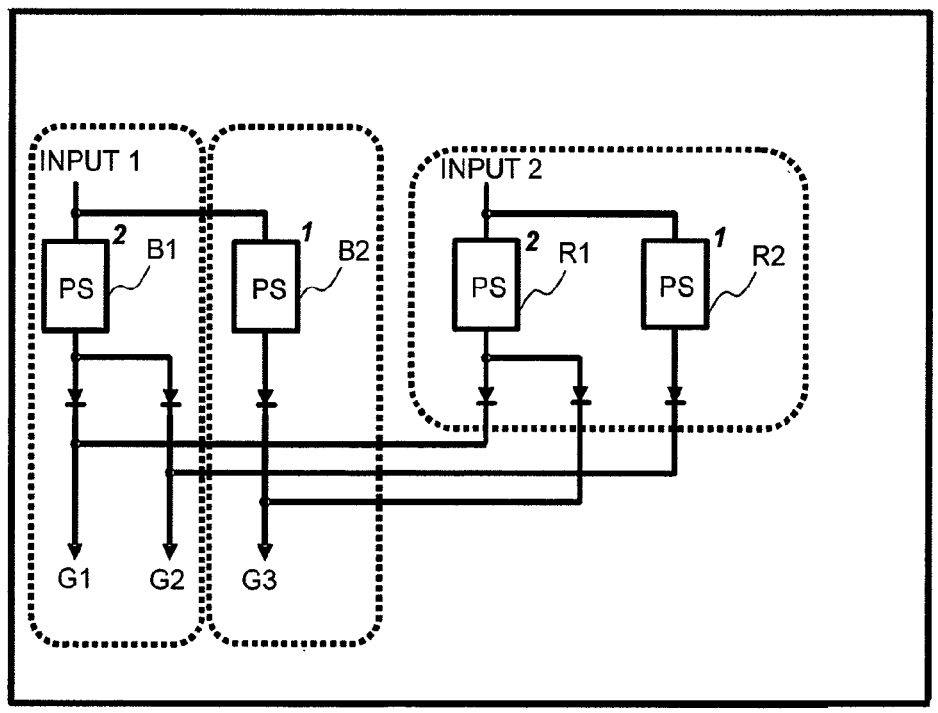
FIG. 13B shows a configuration of a power feeding part where the power supplies R1 to R3 in FIG. 12B are reduced to power supplies R1 and R2.

That is, if the number of power supply boundaries is three, as shown in FIG. 13B, the number of first paths corresponding to the first power supply B1 is reduced from three to two, and consequently, the first power supply B2 is provided so that power feeding will be executed from the first power supply B2 through one first path to the power supply boundary G3. This enables the number of second power supplies to be reduced from three to two. That is, power feeding is executed from the different second power supplies R1 and R2 to the power supply boundaries G1 and G2 which are the power feeding targets from the first power supply B1 respectively, and to the remaining power supply boundary G3, power feeding is executed from the second power supply R1.

Figure 14A:
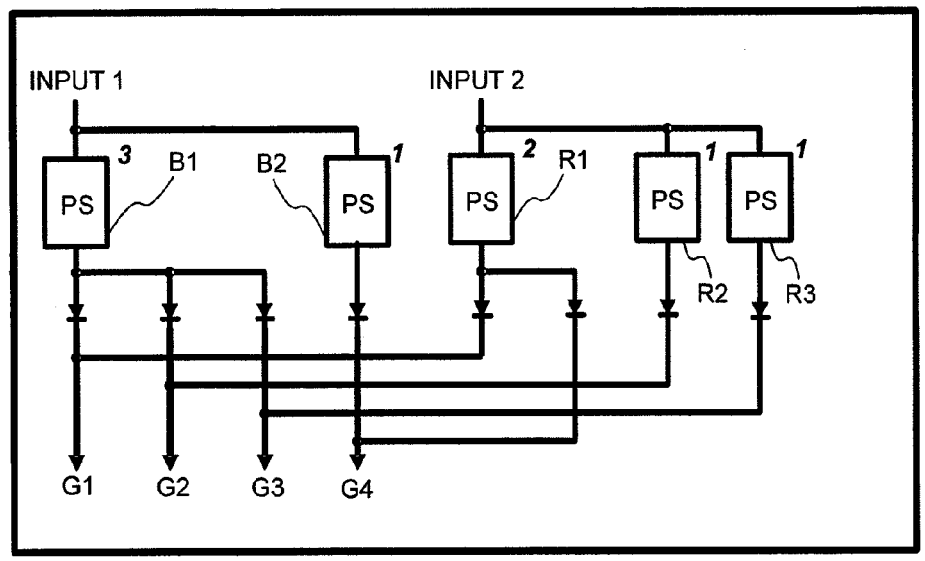
FIG. 14A shows a configuration of a power feeding part where the power supplies R1 to R4 in FIG. 13A are reduced to power supplies R1, R2 and R3.

If the number of power supply boundaries is four, as shown in FIG. 14A, the number of first paths corresponding to the first power supply B1 is reduced from four to three, and consequently, the first power supply B2 is provided so that power feeding will be executed from the first power supply B2 through one first path to the power supply boundary G4. This enables the number of second power supplies to be reduced from four to three. That is, power feeding is executed from the different second power supplies R1 to R3 to the power supply boundaries G1 to G3 which are the power feeding targets from the first power supply B1, and to the remaining power supply boundary G4, power feeding is executed from the second power supply R1.

Figure 14B:
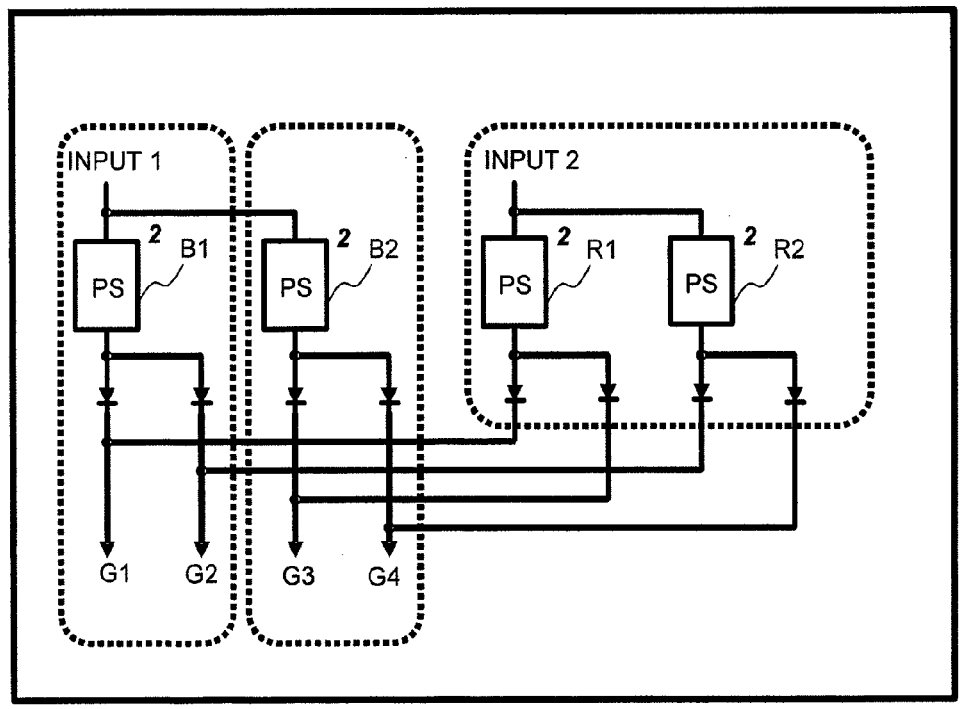
FIG. 14B shows a configuration of a power feeding part where the power supplies R1 to R3 in FIG. 14A are reduced to power supplies R1 and R2.

If the number of power supply boundaries is four, as shown in FIG. 14B, power supplies can be compiled to be even fewer. That is, the number of first paths corresponding to the first power supply B1 is reduced from three to two, and consequently, the number of first paths corresponding to the first power supply B2 is increased from one to two. Power feeding is executed from the first power supply B2 through two first paths to the power supply boundaries G3 and G4. This enables the number of second power supplies to be reduced from three to two. That is, from the different second power supplies R1 and R2, power is supplied to the power supply boundaries G1 and G2 which are the power feeding targets from the first power supply B1 respectively, and to the remaining power supply boundaries G3 and G4, power feeding is executed from the different second power supplies R1 and R2 respectively. According to the configuration shown in FIG. 14B, the number of power supplies is supposed to be reduced from five to four.

Note that, according to FIG. 14B, the power supply capacity of the power supplies B1, B2, R1 and R2 is "2" respectively, which is the sum of the power required for the two power supply boundaries that are the power feeding targets of each power supply. That is, the power supply capacity can be the same through the power supplies B1, B2, R1 and R2. Therefore, one type of power supply is enough for multiple load groups.

To keep the number of power supplies as small as possible, and at the same time, to make one type of power supply enough, it is desirable that, in the formula (1) above, the number of power supply boundaries q should be the square of p (p is an integer larger than one). For example, in case of q=9, the power feeding part can be configured as shown in FIG. 9B, and according to that configuration, the power supply capacity of power supplies B1, B2, B3, R1, R2 and R3 is "3" each, supposing the power required for the power supply boundaries is "1.". That is, only one type of power supply is enough for the power supply boundaries G1 to G9.

Figure 15:
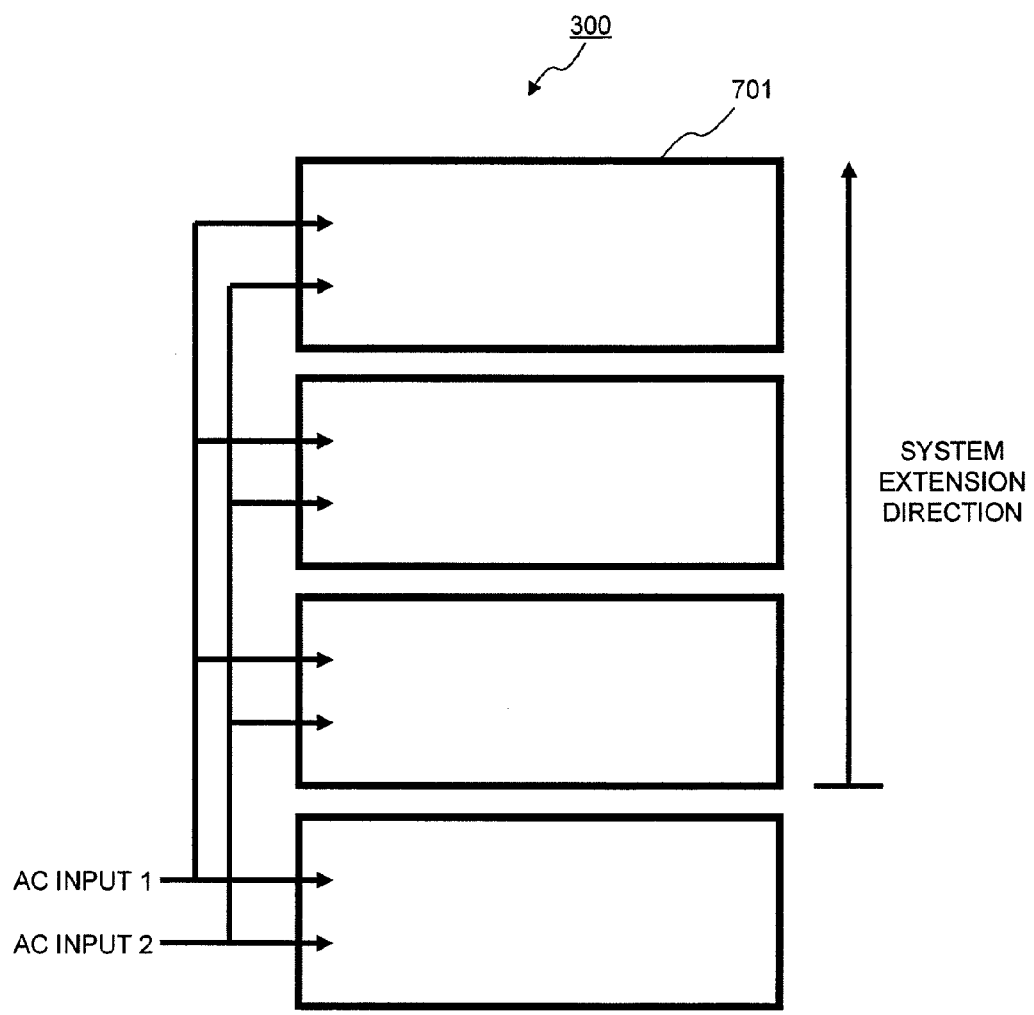
FIG. 15 shows the outline of the configuration of the storage system 300 related to the first embodiment.

The concrete example of the configuration of a storage system related to the first embodiment is described as follows. Note that, in the description below, FIG. 15 shows the outline of the configuration of the storage system 300 related to the first embodiment.

The storage system 300 can be configured of one or more chassis 701. The chassis 701 can be added or reduced. To each chassis 701, power feeding is executed from the AC (alternate current) input 1 and the AC input 2. The AC inputs 1 and 2 are, for example, commercial power supplies respectively.

Figure 16:
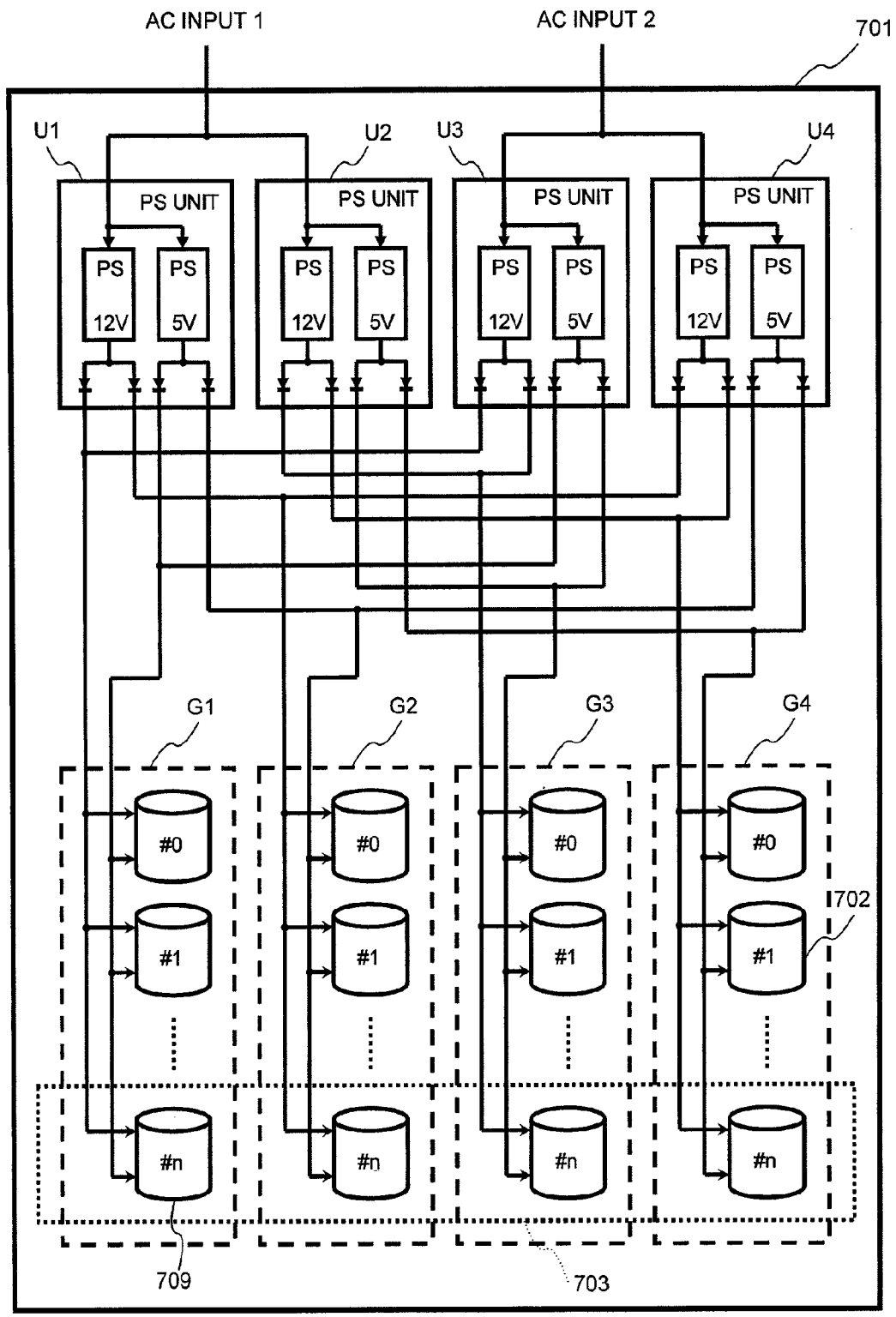
FIG. 16 shows the details of the configuration of a power feeding part in a chassis 701 which the storage system 300 has.

FIG. 16 shows the details of the power feeding part in a chassis 701 that the storage system 300 has.

The storage system 300 has a controller (not illustrated) and multiple HDDs 702. In a chassis 701, a controller and multiple HDDs 702 can all or partly be installed, or the absence of a controller is also accepted. The controller, receiving an input/output request with a specification of a logical volume from an external system that is not illustrated (e.g. a host computer or another storage system), follows the input/output request, and writes data in or reads data from the HDD 702 that is the foundation of the specified logical volume. A logical volume is created based on all the HDDs 702 that comprise a RAID (Redundant Array of Independent (or Inexpensive) Disks) group 703. A RAID group is also called an ECC (Error Correcting Code) group or a parity group. In a RAID group, data is stored according to a specified RAID level.

In a chassis 701, for example, four power supply boundaries (load groups) G1 to G4 are installed. Each of the power supply boundaries G1 to G4 is comprised of two or more HDDs 702. As shown in FIG. 16, a RAID group 703 is comprised of the HDDs 702 that are included in each of the different power supply boundaries G1 to G4 (in the illustrated example, a so-called 3D+1P RAID group is configured for example). That is, the RAID group 703 is located over multiple power supply boundaries G1 to G4. Note that a RAID group 703 can be located over multiple chassis 701 (for example, a RAID group can be configured of HDDs included in the power supply boundaries G1 to G4 respectively and HDDs included in the power supply boundaries of other chassis).

The number of HDDs that the power supply boundaries G1 to G4 have respectively and the power consumption by each HDD are the same. Therefore, the power required by the power supply boundaries G1 to G4 is the same.

Four power supply units U1 to U4 are installed because the number of power supply boundaries is four and the configuration shown in FIG. 14B is adopted. Additionally, in each of the power supply units U1 to U4, as the first power supply or the second power supply, a set of high voltage power supply and a low voltage power supply, more concretely, for example, a set of a 12-void supply and a 5-volt supply, is installed. 12 volt (and 5 volt) is the voltage generally required by HDDs. Power feeding is executed from a 12-volt power supply (and a 5-volt power supply) in the power supply unit U1 to the power supply boundaries G1 and G2 (concretely, all the HDDs 702 in the power supply boundary), and to those power supply boundaries G1 and G2, power feeding is executed from 12-volt power supplies (and 5-volt power supplies) in different power supply units U3 and U4. Either one of the 12-volt power supply or the 5-volt power supplies can be absent from the power supply unit.

In this embodiment, as mentioned above, at least the number of power supplies (12-volt power supplies and/or 5-volt power supplies) that can be calculated through the formula (1) above is provided. For each power supply, one series of input and one or more series of power feeding paths are provided. In each power feeding path, a backflow prevention elemental device (for example, a diode) is installed. Then multiple power supplies are divided for the input 1 series (AC input 1) and for the input 2 series (AC input 2), for each power supply group, as many power feeding paths as power supply boundaries (first path and second path) are installed. From the power supplies (12-volt and 5-volt power supplies) in the power supply unit U1 (U2) that supplies power based on the power from the input 1 series, power is supplied through two first paths to two power supply boundaries, and to those two power supply boundaries, from the power supplies (12-volt and 5-volt power supplies) in the power supply unit U3 (U4) that supplies power based on the power from the input 1 series, power is supplied through two second paths to two power supply boundaries.

In this embodiment, as the input 1 series and the input 2 series are AC inputs, the power supplies in each power supply unit is AC/DC (direct current) power supply (AC/DC converter). Note that the input of the power supply in each power supply unit can also be DC input, and in such a case, the power supply in each power supply unit can be DC/DC power supply (DC/DC converter).

With the configuration shown in FIG. 16, a RAID group is configured in a chassis 701. Therefore, for example, in a storage system with a small number of HDDs, the number of chassis 701 can be optimized, and thus the realization of a small-scale storage system can be expected. Furthermore, even on a small scale, the affected range (blocked range) in an HDD due to failures such as motherboard short can be limited, and thus a highly reliable storage system can be expected.

In addition, with the configuration shown in FIG. 16, the power supplies in the power supply units are AC/DC power supplies, and no DC/DC power supplies are required. This keeps the power feeding part inexpensive as well as reduces the frequency of power conversion, which will expectedly reduce waste of power.

Furthermore, with the configuration shown in FIG. 16, the minimum number of power supplies can both make power supplies for each load group redundant and configure the desired number of power supply boundaries. Concretely, if the number of power supply boundaries is four or more, both of them can be realized with fewer power supplies than the number of power supply boundaries.

Figure 17:
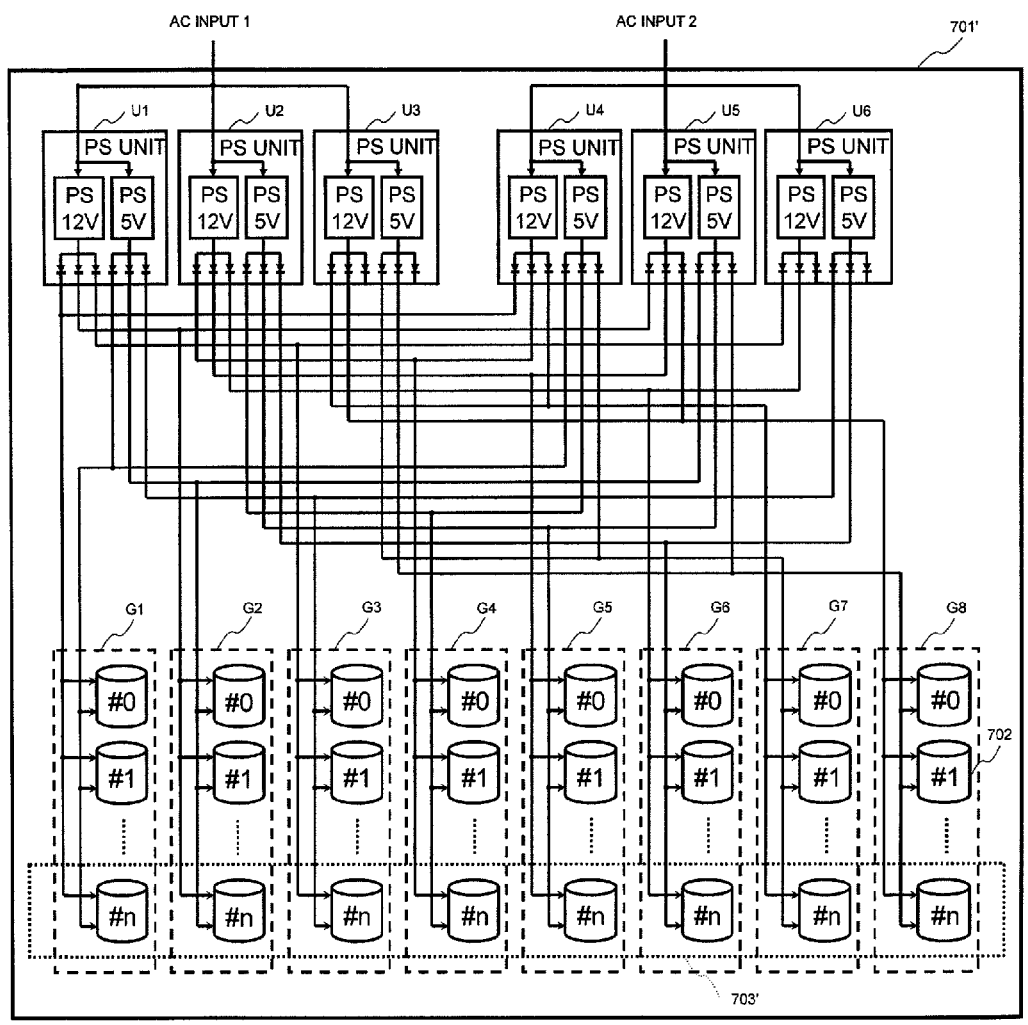
FIG. 17 shows a variation example of the configuration in the chassis 701 in the first embodiment.

The first embodiment was described as above. Note that the number of power supply boundaries in a chassis 701 is not limited to four but it can also be eight, for example, as shown in FIG. 17. In that case, a RAID group is configured of HDDs 702 included respectively in the power supply boundaries G1 to G8. That is, for example, instead of a RAID group 703 of 3D+1P, a RAID group 703' comprised of 7D+1P is configured. In addition, according to the description by referring to FIG. 9A, the total number of first power supplies and second power supplies is six. Therefore, as shown in FIG. 17, six power supply units U1 to U6 are installed in one chassis 701', and first power supplies (a set of a 12-volt power supply and a 5-volt power supply) are installed in each of the power supply units U1 to U3 that receive power from the AC input 1, and second power supplies (a set of a 12-volt power supply and a 5-volt power supply) are installed in each of the power supply units U4 to U6 that receive power from the AC input 2.

[Mode for the Invention 2]

The second embodiment is described below. In the course of the description, the differences from the first embodiment are mainly stated, and the description of what is common to the first embodiment is omitted or stated only briefly.

Figure 18:
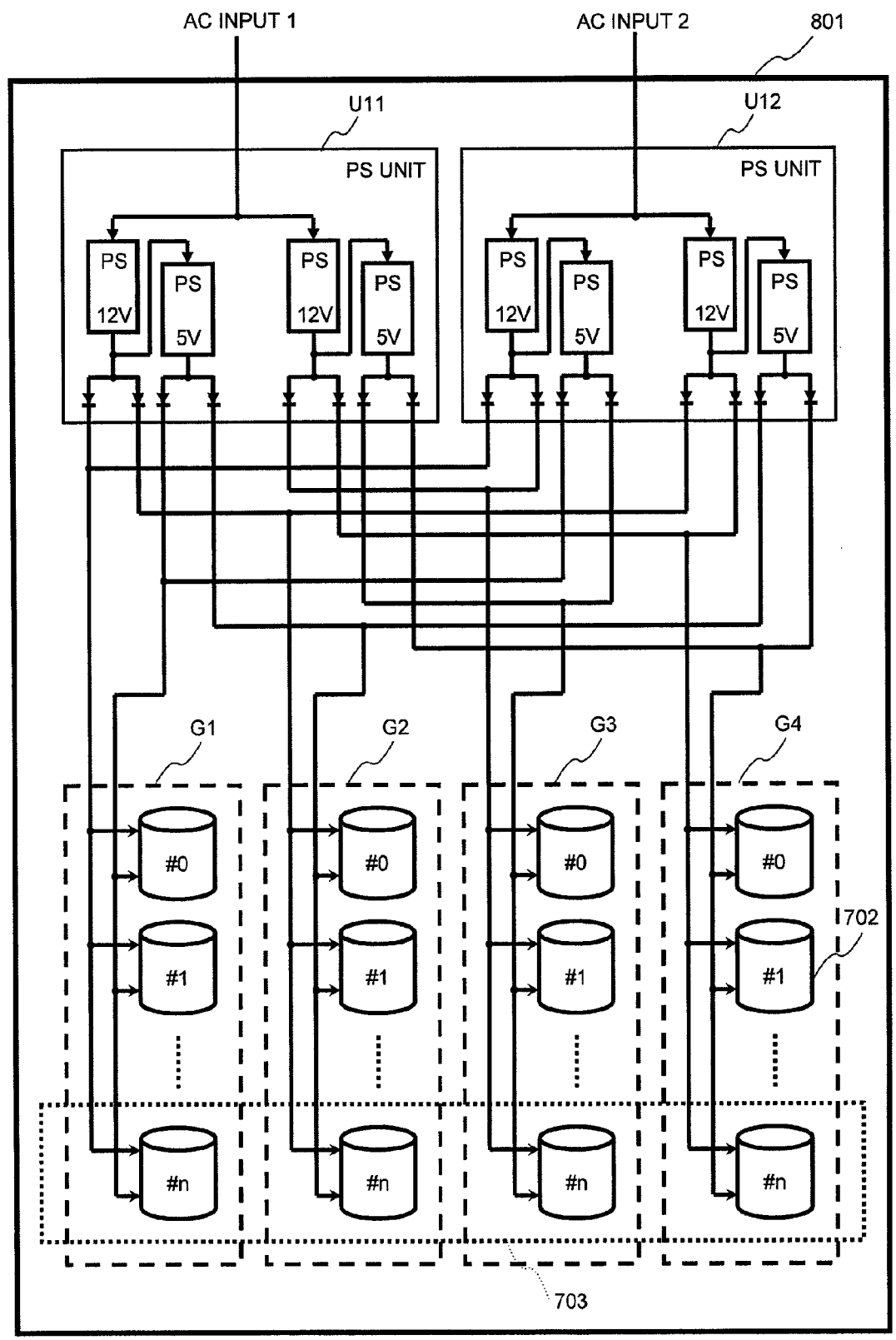
FIG. 18 shows the details of the configuration of a power feeding part in a chassis 801 which the storage system related to the second embodiment of this invention has.

FIG. 18 shows the details of the configuration in the power feeding part of a chassis 801 which the storage system related to the second embodiment of this invention has.

Instead of the power supply units U1 to U4 in the configuration shown in FIG. 16, power supply units U11 and U22 are adopted. That is, two 12-volt power supplies and two 5-volt power supplies are compiled into one power supply unit. This reduces the number of power supply units, and thus, the power feeding part can expectedly be configured inexpensively.

Furthermore, as for the power supply units U11 and U22, in each set (a set of 12-volt power supply and a 5-volt power supply), the 12-volt power supply, which is a high-voltage supply, is placed higher than the 5-volt power supply, which is a low-voltage supply. The 12-volt power supply is the AC/DC converter which converts AC voltage from the AC input 1 (or AC input 2) into 12-volt DC voltage. The 5-volt power supply is the DC/DC converter which steps down 12-volt DC voltage from the 12-volt power supply to 5-volt DC voltage. That DC/DC converter is, for example, a non-insulated DC/DC converter. Thus, the power feeding part can be expected to be configured even more inexpensively.

[Mode for the Invention 3]

The third embodiment is described below. In the course of the description, the differences from the second embodiment are mainly stated, and the description of what is common to the second embodiment is omitted or stated only briefly.

Figure 19:
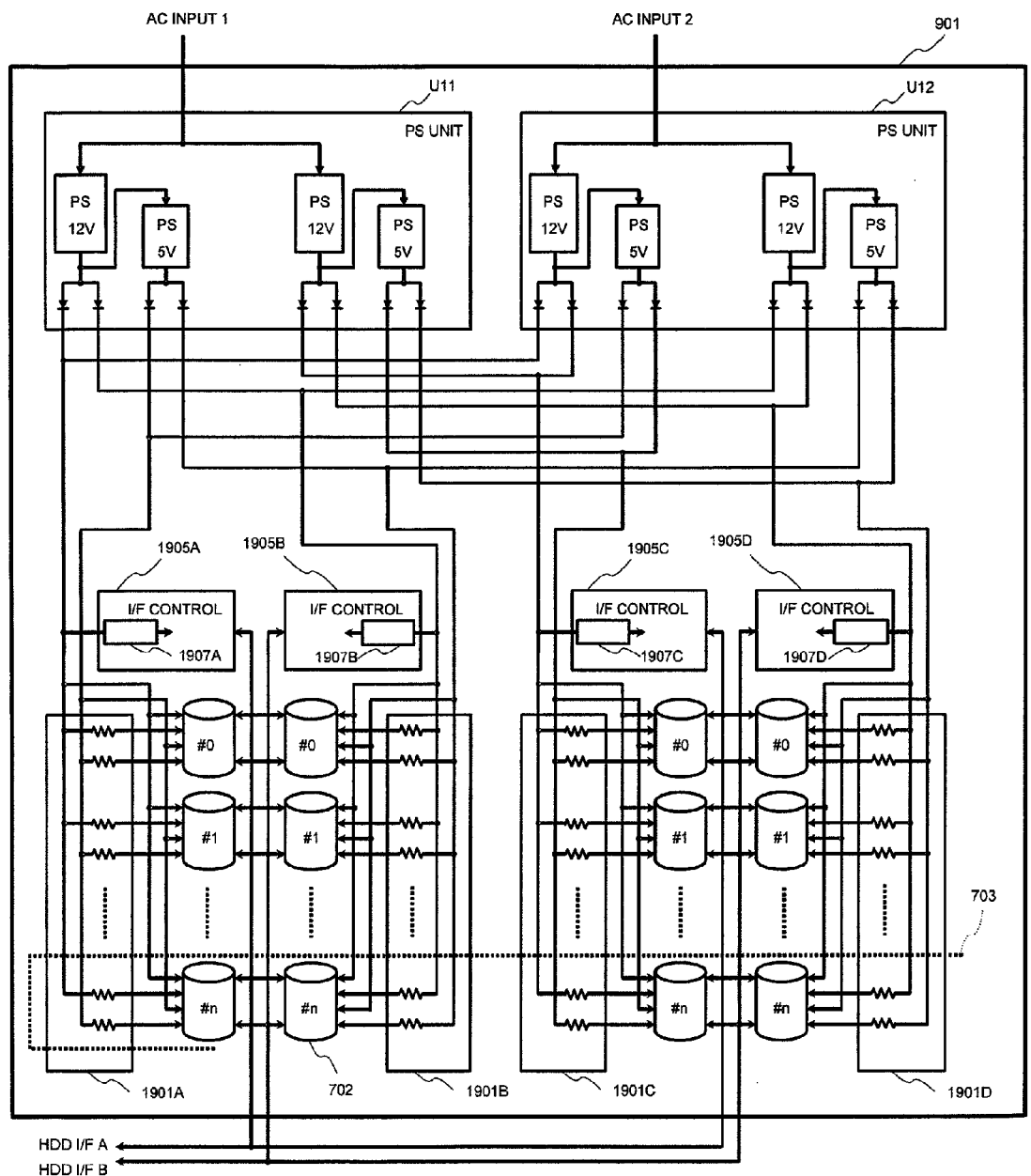
FIG. 19 shows the details of the configuration of a power feeding part in a chassis 901 which the storage system related to the third embodiment of this invention has.

FIG. 19 shows the details of the configuration in the power feeding part of a chassis 901 which the storage system related to the third embodiment of this invention has.

The power feeding targets (loads) from each of the power supply units U11 and U12 are I/F control circuits 1905A to 1905D besides HDDs. In each of the I/F control circuits 1905A to 1905D, an inrush current prevention circuit is installed for inhibiting voltage fluctuation in the power feeding path in hot swap of an HDD 702, etc.

In addition, in this embodiment, inrush current that flows into an HDD 702 in the hot swap of the HDD 702 can be limited by the inrush prevention circuits (such as resistance value) 1901A to 1901D. Therefore, when an HDD 702 is inserted, due to the sequence of the contact, the inrush current prevention circuit 1901A is supposed to be connected first.

While the invention has been described with reference to the preferred embodiment, it is to be clearly understood by those skilled in the art that the invention is not limited thereto, but extend to the various modifications and equivalents as defined in the appended claims.

The invention claimed is:

1. A storage system, comprising:
   a first to a fourth load groups (G1, G2, G8 and G4); and
   a first to a fourth power supplies (B1, B2, R1, and R2), wherein,
   (a1) the first power supply (B1) receives electric power from a first input, supplies electric power to the first load group (G1) via a first path (110A), and supplies electric power to the second load group (G2) via a second path (110B)
   (a2) the second power supply (B2) receives electric power from the first input, supplies electric power to the third load group (G3) via a third path (110C), and supplies electric power to the fourth load group (G4) via a fourth path (110D),
   (a3) the third power supply (R1) receives electric power from a second input, supplies electric power to the first load group (G1) via a fifth path (120A) and the first path (110A) connected to the fifth path (120A), and supplies electric power to the third load group (G3) via a six path (120C) and the third path (110C) connected to the six path (120C);
   (a4) the fourth power supply (R2) receives electric power from the second input, supplies electric power to the second load group (G2) via a seventh path (120B) and the second path (110B) connected to the seventh path (120B), and supplies electric power to the fourth load group (G4) via an eighth path (120D) and the fourth path (110D) connected to the eighth path (120D), according to the (a1) to (a4) configurations, it is possible to make load groups into power supply boundaries and to make power supply system to be redundant, with the same number of power supplies as the number of load groups (G1 to G4),
   wherein each load group (G1, G2, G3 and G4) is composed of a plurality of HDDs (Hard Disk Drives),
   wherein a RAID group is formed of a plural HDDs contained in the different load groups (G1, G2, G3 and G4),
   wherein the number of HDD composing each load group (G1, G2, G8 and G4) is the same, and
   wherein power supply capacity of each of the first to fourth power supplies is the same.

2. The storage system of claim 1, wherein the first to fourth power supplies are AC/DC converters or DC/DC converters.

3. The storage system of claim 1, further comprising:
   a first high voltage power supply and a first low voltage power supply as the first power supply;
   a second high voltage power supply and a second low voltage power supply as the second power supply;
   a third high voltage power supply and a third low voltage power supply as the third power supply; and
   a fourth high voltage power supply and a fourth low voltage power supply as the fourth power supply,
   wherein in each of the first to fourth power supplies, the high voltage power supply receives electric power from the first input or the second input, the low voltage power supply is connected to the high voltage power supply in series, and the low voltage power supply receives electric power from the high voltage power supply.

4. The storage system of claim 3, wherein the high voltage power supply is an AC/DC converter or a DC/DC converter, and the low voltage power supply is a non-isolated DC/DC converter.

5. The storage system of claim 1, wherein:
   wherein a power supply system of each of the HDDs is provided with a rush current prevention circuit for suppressing a voltage fluctuation caused by a hot plug.

* * * * *